United States Patent
La Canfora

[15] 3,703,858
[45] Nov. 28, 1972

[54] APPARATUS FOR PREPARING MASTER RETICLES

[72] Inventor: Peter S. La Canfora, Santa Barbara, Calif.

[73] Assignee: Gyrex Corporation, Santa Barbara, Calif.

[22] Filed: Aug. 31, 1970

[21] Appl. No.: 68,182

[52] U.S. Cl. .......................95/12, 95/1 R, 95/4.5 R
[51] Int. Cl. ..............................................G03b 29/00
[58] Field of Search .........95/12, 4.5, 1 R; 346/107 R

[56] References Cited

UNITED STATES PATENTS

| 3,330,182 | 7/1967 | Gerber et al. ...............95/1 R |
| 3,323,414 | 6/1967 | Ritchie et al. ................95/12 |
| 3,422,442 | 1/1969 | Glendinning et al. .....346/107 |
| 3,458,253 | 7/1969 | Hansen ..................95/12 UX |
| 3,548,713 | 12/1970 | Webster....................95/12 X |
| 3,537,364 | 11/1970 | Pabst..................346/107 R X |
| 3,524,394 | 8/1970 | Sunners..........................95/12 |
| 3,004,469 | 10/1961 | Broyer...........................95/12 |

Primary Examiner—Robert P. Greiner
Attorney—Smyth, Roston & Pavitt

[57] ABSTRACT

A pattern generator comprising a light source from which light rays are directed past a shutter and an adjustable optical slit for delivery to a precision reduction lens which exposes a high resolution photographic plate mounted on a movable mounting fixture. An alphanumeric disk is positioned between the optical slit and the reduction lens so that, if desired, a character or number may be imaged onto the photographic plate.

4 Claims, 3 Drawing Figures

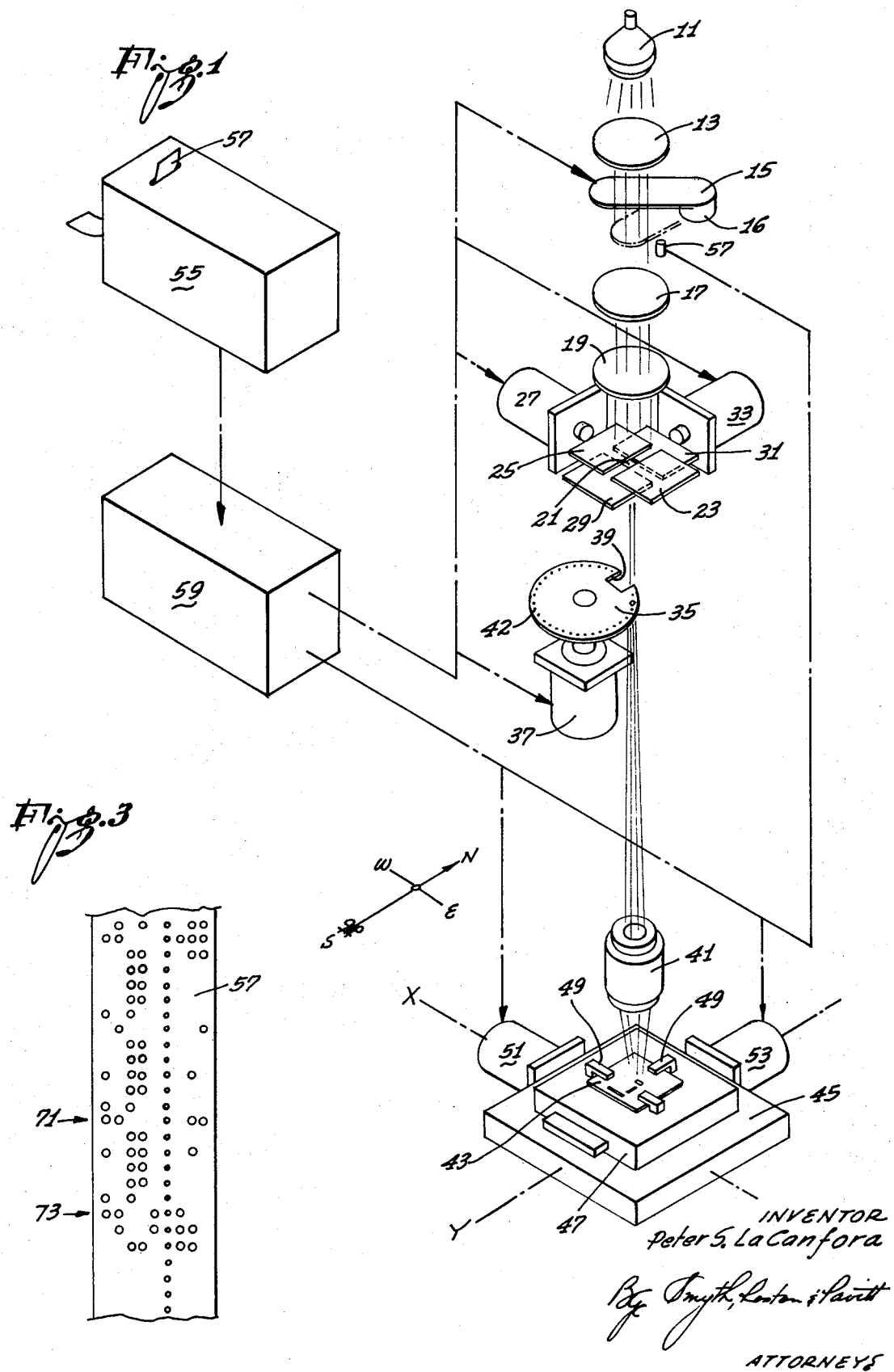

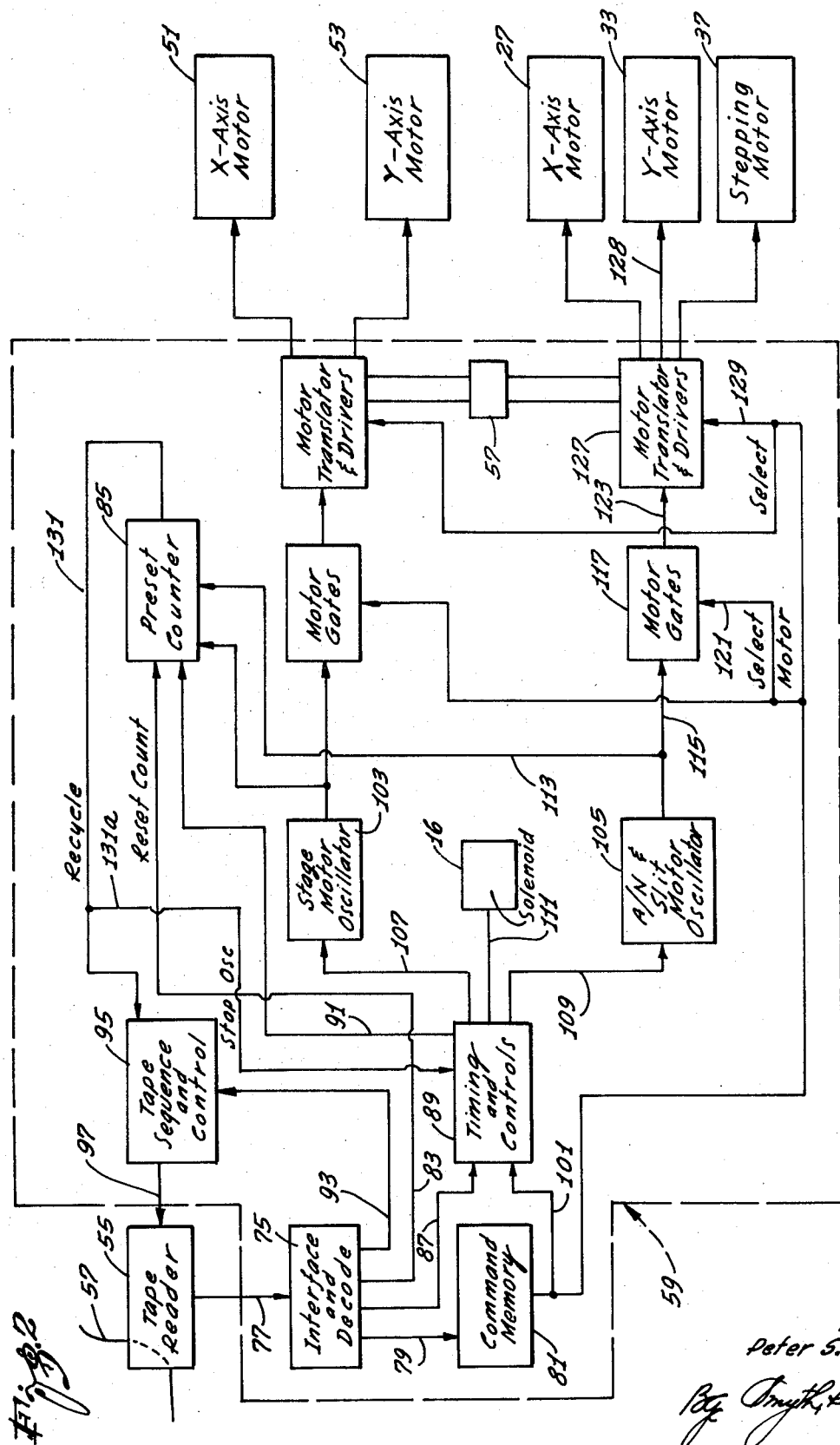

APPARATUS FOR PREPARING MASTER RETICLES

BACKGROUND OF THE INVENTION

In manufacturing integrated circuits, it has become the common practice to design the circuit desired and then draw a very accurate engineering layout of that circuit. In many cases, the engineering layout is as much as 400 times larger than the final circuit which is desired in microminiature form.

Rubylith material consisting basically of a laminated sheet of red and clear plastic material is then placed over the engineering layout and portions of the red laminate are very accurately sliced out so that only the clear laminate covers the circuit drawn on the layout.

When the preparation of the Rubylith is completed, it must be inspected and, if necessary, touched up. When this is accomplished, the Rubylith is positioned in a camera to be reduced to one-fourth its original size; the result is called a "first camera reduction plate," upon which an image of the circuit has been reproduced having a size which is approximately 100 times greater than that desired. When the first camera reduction plate has been fully exposed, it must be developed and then properly dried.

The first camera reduction plate is then used as the object of the reduction camera for a one-tenth reduction to produce a second camera reduction plate upon which the image is photographically reproduced 10 times the size of the final circuit desired. The second camera reduction plate is commonly known as a tooling plate or master reticle which, again, must be developed and dried as the final step of its manufacture.

The master reticle is then used as the object of a step-and-repeat camera which reduces the size of the circuit on the reticle by a factor of ten so as to produce a circuit of the desired size on a microelectronic mask. The step-and-repeat camera is manufactured so that the final circuit is reproduced on the mask in columns and rows a number of times, depending only upon the size of the mask.

When the microelectronic mask has been completed, the images thereon are impressed onto a silicone wafer which is properly etched, etc.; the circuits may be separated when the wafer is cut into tiny portions so that each portion may be properly used in an integrated circuit.

As will be obvious from a review of the above oversimplified description, the number of steps and time and cost in preparing the microelectronic mask are very extensive and highly subject to human error in the preparation of the engineering layout and the Rubylith. In fact, it often occurs that errors in the layout or the Rubylith are not found until some time after the first camera reduction plate has been prepared. When this happens, the initial steps must be repeated at least until a correct first camera reduction plate is produced.

SUMMARY OF THE INVENTION

The present invention comprises a machine for preparing the master reticle without requiring the production of an engineering layout, Rubylith, or first camera reduction plate. The master reticle can be used to manufacture a microelectronic mask or may carry a hybrid circuit which does not require a further reduction in size for use.

More specifically, the invention relates to a machine which is tape-controlled, having an adjustable optical slit through which light may be directed and focused onto a high resolution photographic plate to produce an image which is ten times larger than that desired on the microelectronic mask. An alphanumeric generating device is also positioned within the machine for selective actuation when it is desired to produce a character or number on the photographic plate.

In utilizing the present invention, the circuit designer may produce the master reticle merely by preparing a set of machine instructions which may be manually punched onto a tape or may be punched onto a tape by means of a computer. The tape is then fed into a machine which controls the position of a carriage upon which the photographic plate is mounted the size and shape of the optical slit through which light passes, the actuation of the alphanumeric disk, and the operation of a shutter which controls the time that the light source is allowed to impinge rays upon the photographic plate.

An operator actuates the machine by starting the punched tape through a tape reader and exposure of the master reticle will then be automatically accomplished. When the exposure is completed, and the master reticle has been developed and dried, the reticle can be placed into the step-and-repeat camera for production of the microelectronic mask.

In other words, the production of the mask may be accomplished with very few steps by a process which greatly reduces the possibility of human error since the only place at which error is likely to occur is in the preparation of the instructions from which the tape is produced. If an error should occur in the production of the tape, it can easily be corrected merely by removing the incorrect portion of the tape and splicing a corrected segment in its place. Consequently, the present invention reduces the amount of time necessary to prepare a completed microelectronic mask, reduces the possibility of error in its preparation, and reduces the cost of the materials utilized in preparation thereof.

Other objects, advantages, modes, and embodiments of the present invention will be understood by those skilled in the art by reference to the Detailed Description and accompanying drawings which illustrate what is presently considered to be a preferred embodiment of the best mode contemplated for utilizing the novel principles of the invention which is defined in the claims.

BRIEF DESCRIPTION OF THE DRAWINGS

FIG. 1 is an exploded schematic illustration of a pattern generator formed in accordance with the present invention;

FIG. 2 is a block diagram illustrating electronic circuitry which may be used to control the pattern generator shown in FIG. 1; and FIG. 3 illustrates a short segment of punched tape which may be utilized to control the electronic circuitry of FIG. 2.

DETAILED DESCRIPTION

Referring now to FIG. 1 in greater detail, there is shown a light source 11, which may be xenon or mercury vapor depending upon the particular application to which the machine is to be put. To prevent an excessive amount of heat generated by the light source 11 from reaching the optical system, an infrared filter 13 is positioned adjacent the light source.

The visible light which passes through the infrared filter is delivered to the optical system past a shutter 15 which may be automatically or manually actuated by suitable means such as a solenoid 16. When the shutter is in the open position as illustrated in the drawing, the visible light rays pass through a second filter 17 which will serve to control the wavelength of the light. For example, it may be desired that the peak wavelength be 5,460 angstroms, i.e., the light in the green region in which the photographic plate is most sensitive.

Next, the light rays pass through a diffuser 19 for comprehensive projection of the light on the opening of an optical slit 21.

The optical slit is formed as a rectangle which is controlled in dimension along the X-axis by a first pair of plates 23 and 25 which are actuated toward and away form one another by a motor 27, and along the Y-axis by a second pair of plates 29 and 31 which are similarly actuated by a motor 22. The stepping motors 27 and 33, on command, will open or close their respective plates along the X and Y-axes separately or simultaneously. The portion of the light rays which are allowed to pass through the slit form a beam of light which is shaped by the slit. The image formed by the slit 21, which can be a square or a rectangle, is 10 times larger than the final size of the image to be imposed upon the master reticle.

As the light rays leave the optical slit 21, they pass through a slot 39 in an alphanumeric disk 35 and reach a precision reduction lens 41 which is positioned so as to be focused on slit 21.

If it is desired to project a character, number, symbol, etc., onto the photographic plate, the disk 35 may be rotated to a selected position by a stepping motor 37 which will then position a selected character 42 in the path of the light rays.

The lens 41 is normally focused on the slit 31 but may be repositioned to focus on the selected character 42 on the disk.

In either case, the lens 41 reduces the incoming image to one-tenth its size and focuses it onto a high resolution photographic plate 43. The plate 43 may be quickly and accurately positioned on a movable work fixture 45 by means of a holder 47 having a three-point fastening device comprising arms 49. As shown in the drawing, the fastening device allows an operator to position a plate 43 in the machine very quickly and easily but with a high degree of position accuracy.

When it is desired to form an image on the plate 43, the fixture 45 may be actuated along the X-axis by a motor 51, along the Y-axis by a motor 53, or, if desired to produce an angularly related image or line on the photographic plate, by both. Movement of the plate by means of the stepping motors 51 and 53 is controlled by a tape reader 55 through which a tape, such as that shown at 57 in FIG. 3, is fed.

In order to insure integration of the opening of the shutter 15 and the movement of the fixture 45, a light sensitive photocell 58 is positioned between the shutter and the plate 43 so as to prevent movement of the fixture until the shutter is open. This allows highly accurate images to be formed on the plate while reducing under-exposure of the plate at the beginning of a line, etc.

The tape reader 55 may be of any suitable type, e.g., photoelectric, and it can be set up to control suitable electronic circuitry 59 which, in turn, controls the stepping motors 27, 33, 37, 51, and 53 as well as actuation of the shutter 15.

Referring now to FIG. 2, a block diagram has been set forth to illustrate the operation of the electronic package 59. As shown therein, a tape 57 moves through the tape reader 55 and the intelligence on the tape, as represented by the larger holes shown in FIG. 3, is read by the reader to control the machine. In the present example, the pre-punched paper tape 57 is provided with eight channels, each of which may produce an output signal which can be read by the reader. For example, the signals reading across the eight channels at one linear position of the tape might direct that the work fixture move a prescribed dimension in either the north or south direction along the Y-axis. Alternatively, the signal may require that the optical slit 21 be varied in size by movement of the plates a prescribed distance toward or away from one another.

In any event, in one form of the preferred embodiment of this invention, each signal will be formed by a combination of characters (or letters) and numbers. The characters describe the action to be taken and the direction in which the action is to be accomplished. The numbers prescribe the precise dimension across which the action is to occur. To further illustrate, a signal such as "C0200" punched onto the tape might comprise a series of holes such as indicated opposite the number 71 in FIG. 3. This signal could mean that the optical slit is to be opened in the east-west direction along the X-axis by motor 27 a distance of 0.0200 inches. A signal such as "S0001" might be programmed onto the tape opposite the numbers 73 to indicate that the stage 45 is to move south along the Y-axis, as seen in FIG. 1, a distance of 0.0001 inches. Other, similar signals could be punched into the tape to control the actuation of the shutter 15, the position of the alphanumeric disk 35, etc.

Returning again to FIG. 2, let us assume that a signal A0600 has been read from the tape by reader 55. For the purpose of this illustration, we shall further assume that this signal means that the slit 21 is to be opened in the north-south direction along the Y-axis by motor 33 a distance of 0.0600 inches from whatever its dimension may have been prior to this step.

This signal is generated by the specific combination of holes punched into the tape and it is delivered to an interface and decode circuit 75 along a path 77. The circuit 75 will decode all of the signals coming along the path 77 and adjust them to proper parameters so that they may then be directed along the proper output paths from the circuitry. The signals generated by the letter A, in this case, will be passed along a path 79 to a command memory block 81 in which it will be stored until it is ready to be used. It will be understood by those skilled in the art that this storage period will be very short due to the speed of the machine.

The numerical portion "0600" of the signal is passed from circuitry 75 along a path 83 to a preset counter 85.

A signal generated within the circuitry 75 as a result of the input 77 will pass along a line 87 to a timing and control section 89. In turn, a signal 91 will be generated in section 89 and directed to the preset counter 85. This will cause counter 85 to be programmed so that the signal 83 will be properly stored within the counter so that it is actually stored there as "0600" rather than, for example, "0006."

When one complete eight channel unit of information has entered the block 75, a signal 93 will be generated there which will then be directed to a tape sequence and control block 95. That block, in turn, generates a signal 97 which is directed to the tape reader so that the reader will stop the tape 57 until the actions dictated by the unit have been accomplished.

When the letter and numbers have been properly stored within the command memory 81 and preset counter 85, a signal 101 from the command memory will be directed to the timing and control block 89 which will then select the proper stepping motor oscillator 103 or 105 which is to be actuated by either a signal 107 or 109, respectively. In addition, a signal 111 will be generated at the proper time to actuate the shutter 15.

In the operation we are describing here, the slit motor oscillator 105 will be selected to be actuated as a result of the letter A on the tape. Its actuation will generate a signal 113 which will pass to the preset counter 85, and a signal 115 which will pass to a motor gate 117. The pulses of signal 113 acting on the preset counter 85 will each act to subtract from the "0006" signal set into the counter until that signal is reduced to "0000." Simultaneously, each pulse of the signal 115 will generate one step of the motor 33 which has been selected for actuation in a manner described below. For example, if a motor is selected such that there are 200 steps per revolution of the motor shaft, 600 pulses generated by the oscillator 113 will cause the selected motor to rotate three full revolutions in the selected direction.

Since the signal 115 is available to the motor gate 117, additional information must be provided to determine which of the motors gate 117 controls is to move and in what direction. The motor selection is initiated by a signal 121 generated by the command memory 81 in response to the receipt and storage of the letter A therein as described above. In the present illustration, the signal 121 will be of a value such as to actuate motor 33 since the motor gate 117 which corresponds with oscillator 105 has been actuated.

Motor gate 117 will then initiate a signal 123, in response to receipt of signal 121, which passes to a motor translator driver 127 which then operates to deliver a signal 128 to motor 33 to turn it. As the motor selection is thus completed, a signal 129 which has been stored in the command memory is delivered to the motor translator and driver 127 to determine the direction of the rotation of the selected motor 33.

When the selection and direction of motor 33 has been determined and it turns as directed, the signal 113 will begin sending pulses to counter 85 to perform the countdown. When the counter reaches zero, slit 21 will have been opened 0.0600 inches in the north-south direction and a signal 131 will be generated to actuate tape sequence and control block 95 to initiate a new signal 97 and reactivate the tape reader 55 to move the tape to the next position for reading. Also, when the counter 85 reaches zero, a signal 131a passed through the timing and control section 89 will shut off the previously selected oscillator.

When a new unit of tape information has been presented to the interface and decode circuitry 75, a new cycle is commenced or the machine may be shut off.

Similar actions can be accomplished with the work fixture stepping motors 51 and 53 as well as the alphanumeric stepping motor. Each motor will be selected by a different character or letter code imposed upon the tape and the amount of movement of the stepping motors will be selected by the numerical portion of the signal.

Thus it will be seen that the use of the present invention will significantly reduce the time and effort required to produce a master reticle for the preparation of a microelectronic mask. The use of the invention allows the Rubylith preparation, inspection, and retouching to be totally eliminated, as well as eliminating the need for producing, inspecting, and retouching a first camera reduction plate. Instead, if the tape is properly punched, the master reticle may be prepared directly, developed, dried, and placed directly into the step-and-repeat camera for production of a mask. Therefore, this new and improved concept in the semiconductor and hybrid circuit manufacturing art produces a true advance in that art.

Many further modifications and alterations of the illustrated embodiment will now become apparent to those skilled in the art without exceeding the scope of the invention as defined in the following claims, wherefore what is claimed is:

1. A pattern generator comprising
   a light source,
   means for supporting a high resolution photographic plate relative to said light source,
   means for moving said support means in a single plane relative to said light source,
   means positioned intermediate said light source and said support means defining an optical slit through which rays from said light source may pass comprising,
   a first pair of plates in a first, common plane perpendicular to the path of light which extends from said light source to said support means and
   a second pair of plates in a second, common plane perpendicular to the path of light which extends from said light source to said support means,
   means for adjusting the shape and dimensions of the optical slit comprising
   means for adjusting the distance between adjoining edges of said first pair of plates by moving at least one of said first pair of plates along a first line of motion in said first plane and for adjusting the distance between adjoining edges of said second pair of plates by moving at least one of said second pair of plates along a line of motion in said second plane which is perpendicular to the first line of motion, and
   means for focusing the image formed by said optical slit defining means on a photographic plate mounted on said supporting means.

2. The pattern generator of claim 1 including means for reducing the image formed by the optical slit defining means and focused onto the photographic plate on said supporting means.

3. The pattern generator of claim 1 including
an alphanumeric disk positioned intermediate said light source and said focusing means and
means for positioning selected symbols on said disk in the path of the light rays from said light source.

4. The pattern generator of claim 1 including
shutter means intermediate said light source and said support means for allowing light rays from said light source to reach a photographic plate mounted on said support means only during preselected intervals and
means for actuating said shutter means between a closed, light ray intersecting position and an open position.

* * * * *